US009672577B2

(12) United States Patent
Gatts et al.

(10) Patent No.: US 9,672,577 B2
(45) Date of Patent: *Jun. 6, 2017

(54) ESTIMATING COMPONENT POWER USAGE FROM AGGREGATE POWER USAGE

(71) Applicant: International Business Machines Corporation, Armonk, NY (US)

(72) Inventors: Todd Dickson Gatts, Raleigh, NC (US); Jason Karl Yellick, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 883 days.

This patent is subject to a terminal disclaimer.

(21) Appl. No.: 13/738,867

(22) Filed: Jan. 10, 2013

(65) Prior Publication Data

US 2014/0195178 A1 Jul. 10, 2014

(51) Int. Cl.
*G01R 21/133* (2006.01)
*G06Q 50/06* (2012.01)
*G06F 11/30* (2006.01)

(52) U.S. Cl.
CPC ......... *G06Q 50/06* (2013.01); *G06F 11/3062* (2013.01)

(58) Field of Classification Search
USPC .......................................................... 702/61
See application file for complete search history.

(56) References Cited

U.S. PATENT DOCUMENTS

| 7,366,921 B2 | 4/2008 | Ranganathan |
| 9,020,770 B2 * | 4/2015 | Gatts ..................... G06F 1/3203 |
| | | 702/61 |
| 2005/0116836 A1 | 6/2005 | Perry et al. |
| 2009/0132842 A1 | 5/2009 | Brey et al. |
| 2009/0222682 A1 | 9/2009 | Piper et al. |
| 2011/0016339 A1 | 1/2011 | Dasgupta et al. |

(Continued)

OTHER PUBLICATIONS

Shuai Hao, Estimating Android Applications' CPU Energy Usage via Bytecode Profiling, 2012 IEEE, Computer Science Department, University of Southern California, p. 1-7.*

(Continued)

*Primary Examiner* — Tung Lau
(74) *Attorney, Agent, or Firm* — Garg Law Firm, PLLC; Rakesh Garg; Stephen Yoder

(57) ABSTRACT

A method for estimating component power usage using aggregate power usage data are provided in the illustrative embodiments. A power estimation model is received, the model correlating a factor of the component with an aggregate power consumption of a set of components during a period, the component being a member of the set of components, the component being a hardware device operating in the data processing environment and consuming electrical power, the factor being a characteristic of the component related to the consumption of the electrical power in the component. A value of the factor at a determined time is received. The value of the factor is applied to the power estimation model to generate an estimate of electrical power consumed by the component. The estimate is output as the estimated power usage of the component when the factor attains the value.

8 Claims, 4 Drawing Sheets

(56) References Cited

U.S. PATENT DOCUMENTS

2011/0239010 A1* 9/2011 Jain ...................... G06F 1/3209
                                                            713/310
2014/0249782 A1* 9/2014 Cummings ......... G06F 17/5036
                                                            703/2

OTHER PUBLICATIONS

Cagri Sahin, Initial Explorations on Design Pattern Energy Usage, 2012 IEEE, p. 55-61.*

* cited by examiner

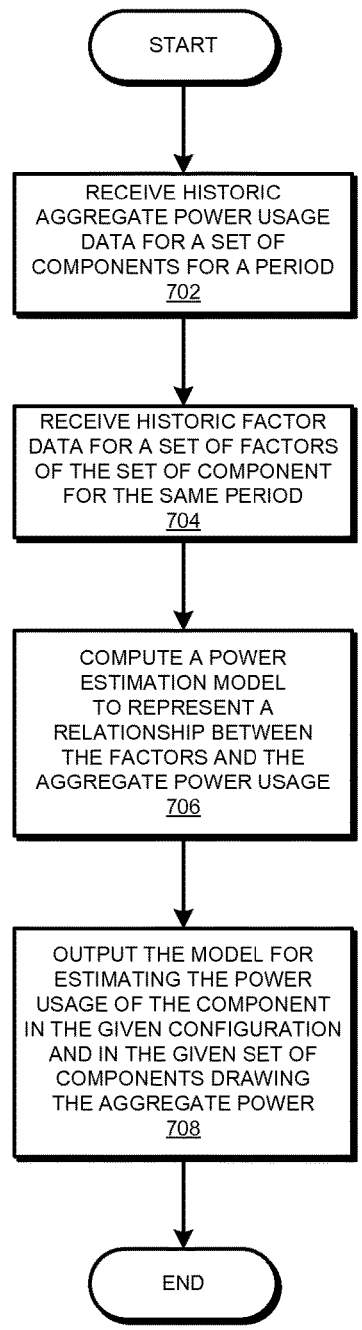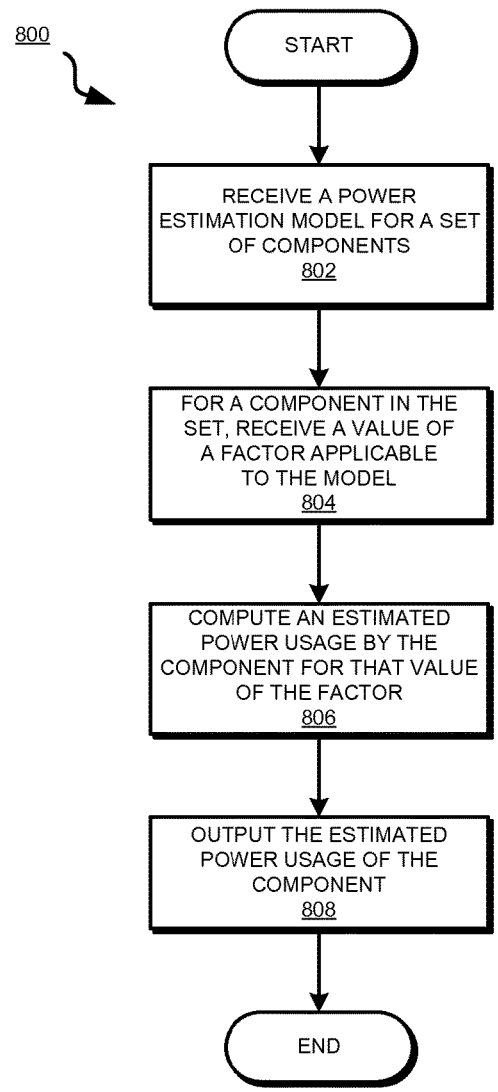

ESTIMATING COMPONENT POWER USAGE FROM AGGREGATE POWER USAGE

BACKGROUND

Technical Field

The present invention relates generally to a computer implemented method for computing the electrical power consumed by a component. More particularly, the present invention relates to a computer implemented method for estimating the electrical power usage of a component in a data processing environment based on an aggregate power usage metric in the data processing environment.

Description of the Related Art

Data processing environments often include multiple data processing systems. The data processing systems each have need for electrical power for performing their respective functions.

In certain data processing environment configurations, such as in a rack, several data processing systems may be configured to receive bulk power over a common power line. The bulk power is then distributed to the various data processing systems via power distribution mechanism.

Any combination of the types of data processing systems may receive power in this manner in a data processing environment. For example, a server data processing system may be collocated with a network attached storage (NAS), and a networking switch in a rack.

As a data processing system is used, such as for performing computations, data input/output (I/O), or data transmission, the data processing system consumes electrical power. Data about the collective power consumption of a combination of data processing systems, such as in a rack or a group of racks is usually available in a data processing environment.

SUMMARY

The illustrative embodiments provide a method for estimating component power usage from aggregate power usage metric in a data processing environment. An embodiment receives a power estimation model, the model correlating a factor of the component with an aggregate power consumption of a set of components during a period, the component being a member of the set of components, the component being a hardware device operating in the data processing environment and consuming electrical power, the factor being a characteristic of the component related to the consumption of the electrical power in the component. The embodiment receives a value of the factor at a determined time. The embodiment applies the value of the factor to the power estimation model to generate an estimate of electrical power consumed by the component. The embodiment outputs the estimate as the estimated power usage of the component when the factor attains the value.

BRIEF DESCRIPTION OF THE SEVERAL VIEWS OF THE DRAWINGS

The novel features believed characteristic of the embodiments are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a flowchart of a process of generating a power estimation model in accordance with an illustrative embodiment; and FIG. 8 depicts a flowchart of a process of estimating the power usage of a component at a given time in accordance with an illustrative embodiment.

DETAILED DESCRIPTION

Figure 1:
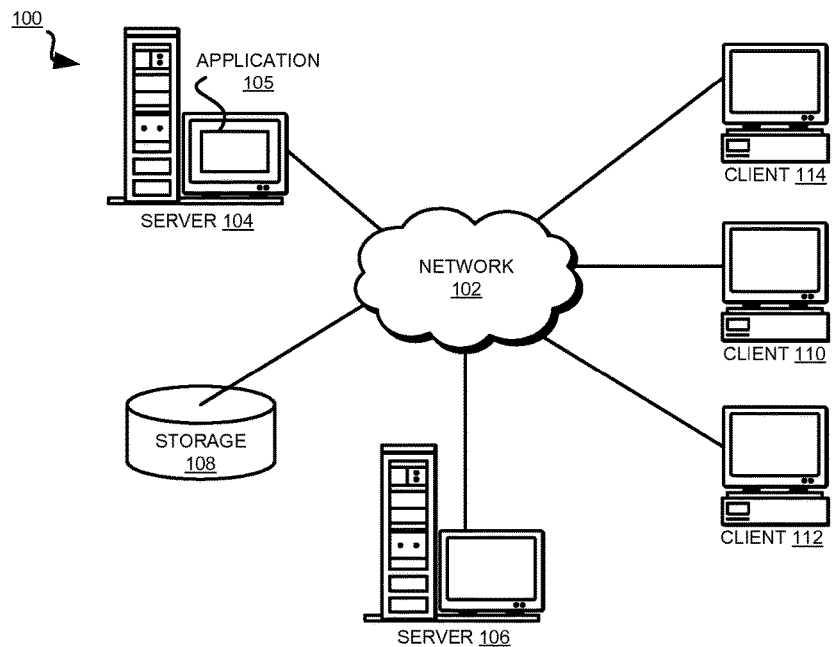
FIG. 1 depicts a pictorial representation of a network of data processing systems in which illustrative embodiments may be implemented.

A component in a data processing environment according to an embodiment is a system that consumes electrical power in a data processing environment and provides measurement of a factor thereof that is related to at least a portion of the power consumption by that system. Some examples of a component according to an embodiment are a server, a NAS, a network switch, a tape drive, a monitor screen, a printer, and a rack drawer.

A factor of a component is a characteristic of the component that is related to power consumption in the component. Some examples of a factor that is related to at least a portion of the component's power consumption (factor) are processor utilization (CPU utilization), network throughput, I/O rate, memory utilization, temperature or heat output, and fan noise or speed. For example, CPU utilization directly causes power consumption, fan noise may not directly cause power consumption but is an indicator of power being consumed in a component, hence related to power consumption in a component. The examples of the component and the factors are not intended to be limiting on the embodiment. Many other components found in data processing environments and many other factors similarly measurable for a component are going to be apparent from this disclosure to those of ordinary skill in the art, and the same are contemplated within the scope of the various embodiments.

The illustrative embodiments of the invention recognize that power consumption metric, to wit, information about power consumption, is presently collected for a group or set of components in a data processing environment. The illustrative embodiments further recognize that knowing the power consumption characteristics of a component, at the component level, is advantageous. For example, a system administrator may wish to know the individual power consumption of a server, and be able to predict the future power consumption of that server to plan a workload. As another example, knowing a server's power consumption at any given time may be useful in deciding whether to configure other components on the same power domain. As another example, knowing which servers consume the most power when doing nothing allows data center administrators to target which systems to "put to sleep" or turn off during low demand, saving not only direct power consumption, but also subsequent cooling demand.

A solution for learning component-by-component power consumption in a data processing environment, using the existing technologies, requires either hardware sensors to be installed in the component, or measuring instruments for taking per-component measurements. Presently available technology for measuring a component's power consumption requires hardware specifically for that purpose. Consequently, present solutions for component-by-component power measurement are expensive and require managing additional equipment in the data processing environment.

The illustrative embodiments used to describe the invention generally address and solve the above-described problems and other problems related to measuring power consumption of components in a data processing environment. The illustrative embodiments provide a method for estimating component power consumption from aggregate power consumption metrics in a data processing environment.

Generally, the illustrative embodiments provide various ways of correlating historical aggregate power consumption data with the historical data of a factor of a component. The correlation yields a model that estimates a change in aggregate power for a change in the factor of the component. Using the model and the changes caused by the changing values of the component's factor, an illustrative embodiment can provide an accurate estimate of the component's affect on the aggregate power consumption, and consequently the component's power consumption.

To provide an estimate of a component's power consumption for a given value of the component's factor, an illustrative embodiment does not require additional hardware, e.g., sensors or measuring instruments. An illustrative embodiment uses only the aggregate power consumption data, which is already measured and readily available in data processing environments without requiring additional hardware, and data of the factor's values, which is also available through existing instrumentation.

The illustrative embodiments are described with respect to certain components only as examples. Such descriptions are not intended to be limiting on the illustrative embodiments. For example, an illustrative embodiment described with respect to a server can be implemented with respect to a data storage component, networking component, peripherals, or sub-components thereof within the scope of the illustrative embodiments.

Similarly, the illustrative embodiments are described with respect to certain factors only as examples. Such descriptions are not intended to be limiting on the illustrative embodiments. For example, an illustrative embodiment described with respect to CPU utilization can be implemented using thermal data or I/O throughput information within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
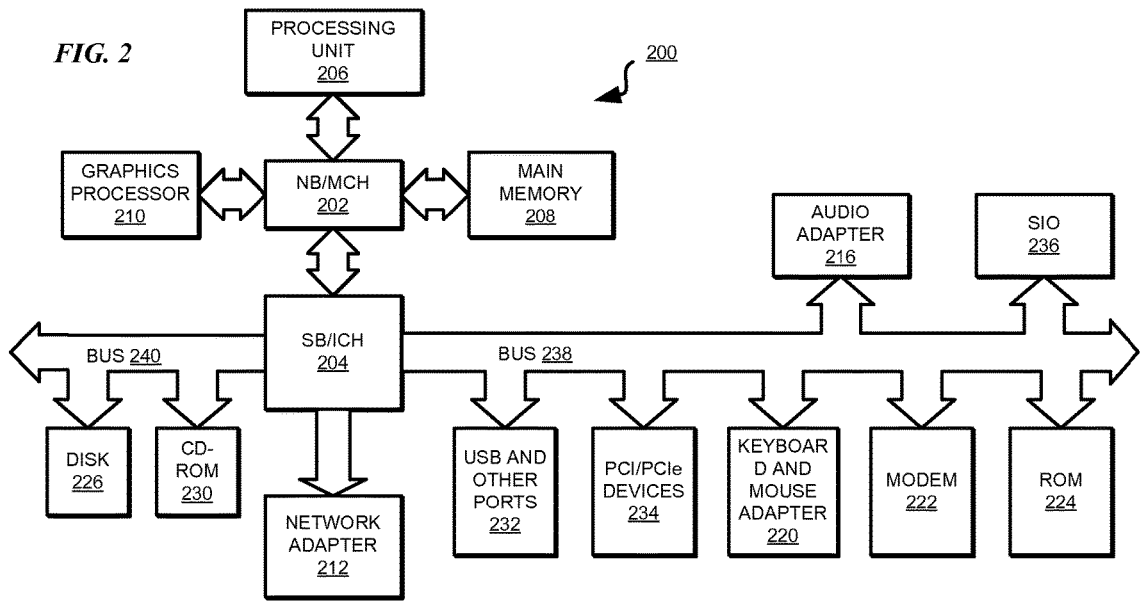
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

A data processing system, such as server 104 may include application 105 executing thereon. Application 105 may implement an embodiment of the invention described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
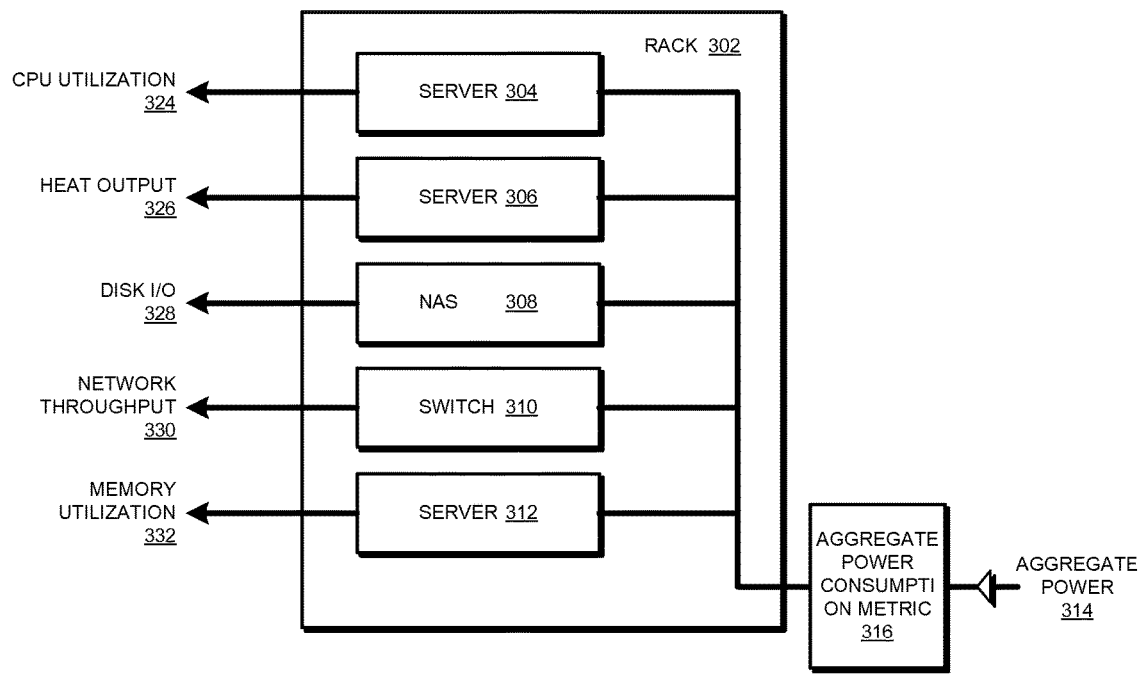
FIG. 3 depicts an example configuration of components whose aggregate power consumption data can be used to estimate a component's individual power consumption in accordance with an illustrative embodiment.

With reference to FIG. 3, this figure depicts an example configuration of components whose aggregate power consumption data can be used to estimate a component's individual power consumption in accordance with an illustrative embodiment. Rack 302 may be one example arrangement in which the components of data processing environment 100 in FIG. 1 can be configured.

As an example, rack 302 is depicted to include component 304, which is a server data processing system, component 306, which is a server data processing system, component 308, which is a NAS, component 310, which is a switch, and component 312, which is a server data processing system. Of course, rack 302 can be configured with any combination of components in any order without limitation.

Aggregate power 314 is available to rack 302 and components 304-312 therein. Aggregate power consumption metric for aggregate power 314 can be measured using existing measurement equipment 316.

Component 304 outputs the measurements of factor 324, which, as an example, may be the CPU utilization of the server data processing system. Similarly, component 306 outputs the measurements of factor 326, which, as an example, may be the heat output (e.g., temperature) of the server data processing system. Component 308 outputs the measurements of factor 328, which, as an example, may be the disk I/O rate of the NAS. Component 310 outputs the measurements of factor 330, which, as an example, may be the network throughput of the switch. Similarly, component 312 outputs the measurements of factor 332, which, as an example, may be the memory utilization of the server data processing system.

A single rack arrangement is used in FIG. 3 only as an example for the clarity of the description and not as a limitation on the invention. Generally, a single rack is a member of a larger collection of racks and components in a data processing environment, where aggregate power consumption is measured using measurement equipment 316 much farther upstream at a power distribution unit (PDU). The PDU measures the power being delivered to a circuit. Many racks will typically be served by the circuit, and so the aggregate power is collected for many racks in a typical data processing environment. The embodiments of the invention described with respect to rack 302 are similarly applicable to a multi-rack arrangement in a similar manner within the scope of the invention.

Figure 4:
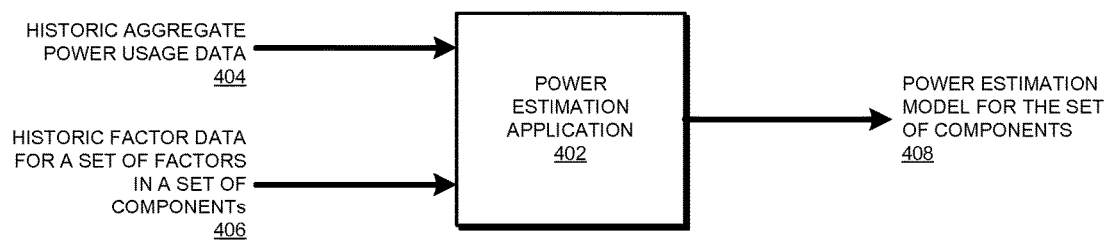
FIG. 4 depicts a block diagram of an operation of a power estimation application in accordance with an illustrative embodiment.

With reference to FIG. 4, this figure depicts a block diagram of an operation of a power estimation application in accordance with an illustrative embodiment. Power estimation application 402 may be implemented as application 105 in FIG. 1.

Power estimation application 402 receives as input historic aggregate power usage data 404. As an example, historic aggregate power usage data 404 may be collected from aggregate power consumption measurement equipment 316 in FIG. 3.

A component may maintain historic factor data for a set of factors that is related to the component's power usage in historic aggregate power usage 404. A set of factors is one or more factors. A set of components, each having a set of such factors, may collectively consume power to result in historic aggregate power usage data 404.

Power estimation application 402 receives as input historic factor data 406, which includes historic factor data for a superset of the sets of factors of a given set of components that generated historic aggregate power usage data 404. As an example, a portion of historic factor data 406 may be available from a log of factor 324—CPU utilization of server data processing system component 304, in FIG. 3, another portion of historic factor data 406 may be available from a log of factor 326—heat output of server data processing system component 306, in FIG. 3, another portion of historic factor data 406 may be available from a log of factor 328—disk I/O throughput of NAS component 308, in FIG. 3, and so on.

Using multiple samples of historic aggregate power usage data 404, correlated with historic factor data 406, power estimation application 402 generates power estimation model 408 for the set of components. As an example, power estimation application 402 may perform regression analysis using inputs 404 and 406, as described elsewhere in this disclosure.

Note that input 404 can be the historic aggregate power usage data for any combination of components, input 406 can be for a superset of any suitable sets of factor for a given set of components. Model 408 is capable of estimating the individual power usage of a specific component in that set of components using a factor of the specific component that participated in input 406.

Furthermore, model 408 is specific to that component as configured when inputs 404 and 406 were collected. For example, if data for inputs 404 and 406 was collected when that component was configured with certain sub-components, e.g., a number of processors, a size of memory, certain adapters, and other sub-components, model 408 will be valid for estimating that component's power usage at any given time for the component in substantially the same configuration.

Aggregate power usage data 404 includes several aggregate power usage values sampled at discrete times. An aggregate power usage value at a given discrete time is time-correlated to a set of factor values from a set of components contributing to the aggregate power usage at that discrete time. Thus, an aggregate power usage value forms an aggregate power usage data sample in time. Multiple samples collected in this manner are analyzed to develop the model parameters belonging to an individual component, as will be evident from an example model creation methodology described in this disclosure.

As long as a component is not reconfigured with sub-components that are different from the sub-components at the time of the sampling, the model parameters for an individual component remain valid even if the set of components that contributed to the aggregate power usage changes. This assertion is true because when new components are added to the set of components, factors from those components do not yet participate in existing power estimation model 408. Therefore, the new components do not affect the model parameters of existing model 408, and the power usage estimation for an individual component that did participate in model 408 remains accurate.

Of course, model 408 can be revised should the configuration of that component change or the configuration of the set of components should change. Revised model 408 may be valid for estimating that component's power usage at any given time for the component in the new configuration. Furthermore, continuing analysis may be employed to refine the accuracy of the model parameters for existing components, and to generate new or different model parameters for new components.

As described in this disclosure, this manner of estimating a component's individual power usage at any given time, present or in the future, requires no additional hardware costs, configuration, or management. Power estimation application 402 can be executed on an existing data processing system, and data already collected in a data processing environment can be provided as inputs 404 and 406.

Figure 5:
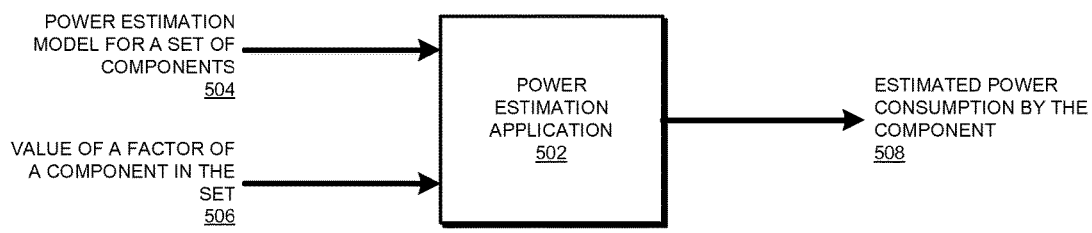
FIG. 5 depicts a block diagram of another operation of a power estimation application in accordance with an illustrative embodiment.

With reference to FIG. 5, this figure depicts a block diagram of another operation of a power estimation application in accordance with an illustrative embodiment. Power estimation application 502 may be implemented as application 105 in FIG. 1. In one embodiment, power estimation application 502 may be the same as power estimation application 402 in FIG. 4. In another embodiment, owing to the different operations depicted in FIGS. 4 and 5, applications 402 and 502 may be implemented as separate applications.

Power estimation application 502 receives as an input power estimation model 504 for a set of components. Power estimation model 504 may be analogous to power estimation model 408 in FIG. 4.

Power estimation application 502 receives as another input value 506 of a factor of a component in the set of components. Power estimation application 502 applies value 506 to model 504 to generate estimated power consumption 508 by the component when the factor of the component attains value 504.

Figure 6:
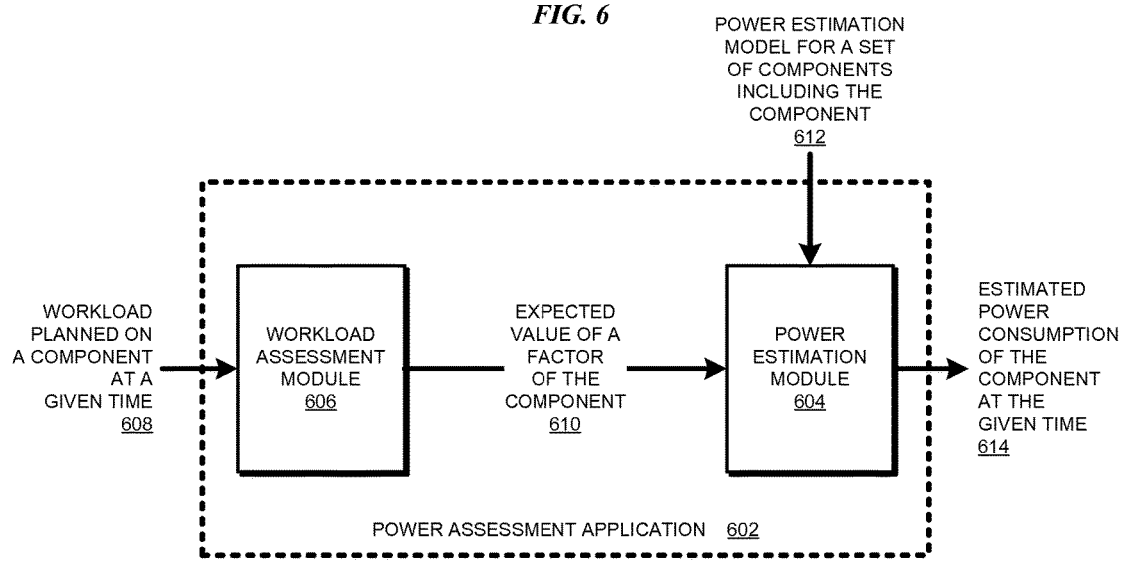
FIG. 6 depicts a block diagram of another operation of a power estimation application in accordance with an illustrative embodiment.

With reference to FIG. 6, this figure depicts a block diagram of another operation of a power estimation application in accordance with an illustrative embodiment. Power estimation application 602 may be implemented as application 105 in FIG. 1. In one embodiment, power estimation application 602 may be an enhancement over power estimation application 502 in FIG. 5.

Power estimation application 602 may include power estimation module 604, which estimates the power usage given a value of a factor of a component and a power estimation model for that component. Power estimation application 602 may further include workload assessment module 606. Workload assessment module 606 accepts workload plan 608 as input. Workload plan 608 may be the workload that is planned for execution on a component whose power usage is to be estimated. Workload assessment module 606 determines expected value 610 of a factor of the component for the time when the workload of workload plan 608 will be executed on the component.

Power estimation module 604 receives as one input expected value 610 of the factor. Power estimation module 604 receives as another input power estimation model 612 of that component for that factor. As described with respect 612. Similar to power estimation model 504 in FIG. 5, power estimation model 612 is a power estimation model for a set of components including the component on which planned workload 606 is scheduled. Power estimation module 604 outputs estimated power consumption 614 of the component at the time of execution of the workload of workload plan 608.

With reference to FIG. 7, this figure depicts a flowchart of a process of generating a power estimation model in accordance with an illustrative embodiment. Process 700 may be implemented in a power estimation application, such as power estimation application 502 in FIG. 5 or power estimation application 602 in FIG. 6.

Process 700 begins by receiving historic aggregate power usage data for a set of components for a period (step 702). The data of step 702 may be for any given set of components and given configurations of components in the set.

Process 700 receives historic data of a set of factors of the set of components for the same period (step 704). Process 700 computes a power estimation model to represent a relationship between the factors of step 704 and the aggregate power usage of step 702 (step 706).

Again, taking CPU utilization of a component as an example, the power used by the component has some degree of correspondence with the utilization of the component's CPU. In some cases, the correspondence may be linear, expressed as an equation of the first order, or a linear equation. In some other cases, the correspondence may be a non-linear curve represented by a quadratic equation, an equation of a second order.

Generally, the correspondence may be any curve, represented by equations of any order, and using any number of parameters. The equations that describe the correspondence between the curve of the historic factor data and the curve of the historic aggregate power usage data are part of the power estimation model generated by an embodiment. The model generation process is described elsewhere in the disclosure using an example quadratic equation and regression analysis thereon.

Process 700 outputs the model for estimating the power usage of the component, in the given configuration, and in the given set of component that was drawing the aggregate power of step 702 (step 708). Process 700 ends thereafter.

With reference to FIG. 8, this figure depicts a flowchart of a process of estimating the power usage of a component at a given time in accordance with an illustrative embodiment. Process 800 may be implemented in a power estimation application, such as power estimation application 502 in FIG. 5 or power estimation application 602 in FIG. 6.

Process 800 begins by receiving a power estimation model for a set of components, such as the model output at step 708 in process 700 in FIG. 7 (step 802). Process 800 receives a value of a factor for a component applicable to the model (step 804). Process 800 computes an estimated power usage for that component for that value of the factor (step 806). Process 800 outputs the estimated power usage of the component (step 808). Process 800 ends thereafter.

Following is a description of the model generation process using one or more example implementations. The description uses one or more servers as example components, and the CPU utilization of a server as an example factor. The example power estimation model is generated by selecting a polynomial equation of a suitable order and using a least squares regression to find the parameters of the equation.

Note that this description is an example way of generating the model that is usable in accordance with an illustrative embodiment. The embodiments of the invention, however, are not limited to this particular description of model generation, as one of ordinary skill in the art will be able to conceive from this disclosure many variations and alternatives to this manner of generating the model. Such variations and alternatives are contemplated within the scope of the illustrative embodiments.

1. Power Model for an Individual Server

Consider servers (components) as having three defining characteristics for power consumption—idle power consumption, maximum (max) utilization power consumption, and a third parameter which determines how consumption changes between these two points. The assumptions therefore are that when a component is using zero percent of the component's CPU, the component will consume idle power, and when the component is using one hundred percent of the component's CPU, the component will consume max utilization power. Notationally, $p(0) = p_{idle}$ $p(1) = p_{max}$ A reasonable assumption for simplification of the description is that the power consumption monotonically increases as the CPU increases from zero to one hundred percent. Therefore the following model for individual CPU usage emerges—

$$p(x) = p_{idle} + (p_{max} - p_{idle})(1-c)x + (p_{max} - p_{idle})cx^2$$

Note that the assumptions for p(0) and p(1) hold and c is an arbitrary parameter which will determine the 'slope' of the curve.

2. Power Model for Server Group

By simply extending the power model of a single server to a group of servers (generally, from a single component to a set of components) we achieve a model for the power usage of a group of servers as follows—

$$p_{total} = \sum_{m=1}^{n_{servers}} p_{idle}^{(m)} + (p_{max}^{(m)} - p_{idle}^{(m)})(1-c^{(m)})x_m + (p_{max}^{(m)} - p_{idle}^{(m)})c^{(m)}x_m^2$$

Or alternatively in a matrix Ay=b as:

$$A = (\begin{matrix} 1 & x_1 & x_1^2 & \cdots & 1 & x_{n_{servers}} & x_{n_{servers}}^2 \end{matrix})$$

$$y = \begin{pmatrix} p_{idle}^{(1)} \\ (p_{max}^{(1)} - p_{idle}^{(1)})(1-c^{(1)}) \\ (p_{max}^{(1)} - p_{idle}^{(1)})c^{(1)} \\ \vdots \\ p_{idle}^{(n_{servers})} \\ (p_{max}^{(n_{servers})} - p_{idle}^{(n_{servers})})(1-c^{(n_{servers})}) \\ (p_{max}^{(n_{servers})} - p_{idle}^{(n_{servers})})c^{(n_{servers})} \end{pmatrix}$$

$$b = p_{total}$$

Note that the column vector is a constant while $p_{total}$ and the row vector are dependent on sample. Therefore, given k samples, the vector equality can be converted into a larger system.

$$A = \begin{pmatrix} 1 & x_{1,1} & x_{1,1}^2 & \cdots & 1 & x_{1,n_{servers}} & x_{1,n_{servers}}^2 \\ \vdots & \vdots & \vdots & \vdots & \vdots & \vdots & \vdots \\ 1 & x_{k,1} & x_{k,1}^2 & \cdots & 1 & x_{k,n_{servers}} & x_{k,n_{servers}}^2 \end{pmatrix}$$

$$y = \begin{pmatrix} p_{idle}^{(1)} \\ (p_{max}^{(1)} - p_{idle}^{(1)})(1-c^{(1)}) \\ (p_{max}^{(1)} - p_{idle}^{(1)})c^{(1)} \\ \vdots \\ p_{idle}^{(n_{servers})} \\ (p_{max}^{(n_{servers})} - p_{idle}^{(n_{servers})})(1-c^{(n_{servers})}) \\ (p_{max}^{(n_{servers})} - p_{idle}^{(n_{servers})})c^{(n_{servers})} \end{pmatrix}$$

$$b = \begin{pmatrix} p_{total}^{(1)} \\ \vdots \\ p_{total}^{(k)} \end{pmatrix}$$

The system is now of the form Ay=b where A is k× 3·$n_{servers}$. If A can achieve full column rank, then there is a unique (least squares) solution $\hat{y}$ which minimizes $\|A\hat{y}-b\|$. One issue may be that Rank(A)≤2·$n_{servers}$+1 because of the $n_{servers}$ linearly dependent columns of ones. This means, that independent of the number of samples, A will never be full column rank and will therefore be under-determined. This leaves at least $n_{servers}-1$ free variables with equally valid solutions.

3. The Quest for Full Column Rank 3.1 Collapsing the Dependent Columns

One solution to achieve full column rank is to collapse the linearly dependent columns into a single column.

$$A = \begin{pmatrix} x_{1,1} & x_{1,1}^2 & \cdots & x_{1,n_{servers}} & x_{1,n_{servers}}^2 & 1 \\ \vdots & \vdots & \vdots & \vdots & \vdots & \vdots \\ x_{k,1} & x_{k,1}^2 & \cdots & x_{k,n_{servers}} & x_{k,n_{servers}}^2 & 1 \end{pmatrix}$$

$$y = \begin{pmatrix} (p_{max}^{(1)} - p_{idle}^{(1)})(1-c^{(1)}) \\ (p_{max}^{(1)} - p_{idle}^{(1)})c^{(1)} \\ \vdots \\ (p_{max}^{(n_{servers})} - p_{idle}^{(n_{servers})})(1-c^{(n_{servers})}) \\ (p_{max}^{(n_{servers})} - p_{idle}^{(n_{servers})})c^{(n_{servers})} \\ \sum_{i=1}^{n_{servers}} p_{idle}^{(i)} \end{pmatrix}$$

$$b = \begin{pmatrix} p_{total}^{(1)} \\ \vdots \\ p_{total}^{(k)} \end{pmatrix}$$

This solution elects to lose the information about each individual server's (component's) idle power consumption in favor of an entire rack's (component set's) power consumption. This result is intuitive because generally no information regarding the off state of any of the components is available in the $p_{total}$ values.

3.2 in Homogenous Environments

Homogeneous environments are easier to solve. If the power data were for a rack of identical configured machines (a set of identically configured components), then a reasonable expectation may be that each machine would have identical idle power consumption and the total idle power can simply be divided by the total number of machines to determine individual idle power. The problem collapses even further, because for identically configured machines, all parts of the power curve could be expected to be identical and the system reduces to the following.

$$A = \begin{pmatrix} n_{servers} & \sum_{i=1}^{n_{servers}} x_{1,i} & \sum_{i=1}^{n_{servers}} x_{1,i}^2 \\ \vdots & \vdots & \vdots \\ n_{servers} & \sum_{i=1}^{n_{servers}} x_{k,i} & \sum_{i=1}^{n_{servers}} x_{k,i}^2 \end{pmatrix}$$

$$y = \begin{pmatrix} p_{idle} \\ (p_{max} - p_{idle})(1-c) \\ (p_{max} - p_{idle})c \end{pmatrix}$$

-continued $$b = \begin{pmatrix} p_{total}^{(1)} \\ \vdots \\ p_{total}^{(k)} \end{pmatrix}$$

The number of samples could theoretically be collapsed and reduced to 3. However, homogeneous environments cannot be assumed in operation.

3.3 Marginal Power Consumption

Note that although the idle power consumption of each machine (component) is lost by choice, the power curve following the idle power consumption is not. Each server's (component's) marginal power consumption, i.e., the amount of additional power the server consumes remains available.

$$p(x) - p_{idle} = (p_{max} - p_{idle})(1-c)x + (p_{max} - p_{idle})cx^2$$

$$p_{marginal} = p_{max} - p_{idle} = p(1) - p_{idle}$$

The marginal power consumption of a component be useful in calculating the idle power consumption of the component. The basic reasoning being that a machine which has a marginal power consumption of five kilowatts is unlikely to have an idle power consumption of one hundred watts. Similarly, a machine which has a marginal power consumption of four hundred watts is unlikely to have an idle power consumption of five hundred watts. A heuristic could be developed where the idle power is a percentage of the marginal power, for example, by assuming that a machine's idle power consumption is approximately forty percent of the machine's marginal power consumption.

3.4 A Simple and Elegant Solution

Although not enough information in the power samples on a rack of servers is normally available to identify the idle power consumption of each server, slightly more data is available. In particular, if a set of components is not homogenous as described above, it is likely that multiple sets of components with multiple mixes of components, each with its own power profile is available. Consider that a datacenter is running q different types of servers, denoted $S_1, S_2, \ldots, S_q$ with idle powers denoted by $p_{idle}^{S_1}, \ldots, p_{idle}^{S_q}$. Then the idle power consumption for a rack of servers could be given by $$\sum_{i=1}^{q} p_{idle}^{S_i} \cdot (S_i^\#)$$

where $S_i^\#$ denotes the number of servers of type $S_i$ in the rack. Alternatively this sum can be expressed as a vector.

$$(S_1^\# \ldots S_q^\#) \begin{pmatrix} p_{idle}^{S_1} \\ \vdots \\ p_{idle}^{S_q} \end{pmatrix}$$

Note that this sum is equivalent to one of the known results from section 3.1. Denote this sum as the rack idle power consumption $r_{idle}$.

$$\sum_{i=1}^{q} p_{idle}^{S_i} \cdot (S_i^\#) = \sum_{i=1}^{n_{servers}} p_{idle}^{(i)}$$

$$= r_{idle}$$

It can be expected that in a datacenter, there will be many different racks (define $n_{racks}$ to be this number), which leads to a system of equations, in matrix form:

$$\begin{pmatrix} S_1^{\#1} & \ldots & S_q^{\#1} \\ \vdots & \vdots & \vdots \\ S_1^{\#n_{racks}} & \ldots & S_q^{\#n_{racks}} \end{pmatrix} \begin{pmatrix} p_{idle}^{S_1} \\ \vdots \\ p_{idle}^{S_q} \end{pmatrix} = \begin{pmatrix} r_{idle}^{(1)} \\ \vdots \\ r_{idle}^{(n_{racks})} \end{pmatrix}$$

So long as there are at least q linearly independent rows ($n_{racks} \geq q$), then the least squares regression will be well posed without free variables. The same techniques, such as collapsing dependent rows into a single row, apply in this least squares problem just as it did in the parent one. If this system can be successfully solved, then a component's power profile will be known according to an embodiment.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for estimating component power usage from aggregate power usage in a data processing environment. Using an embodiment of the invention, the power being consumed by an individual component can be estimated even when the individual component is not instrumented for individual power measurement. Aggregate power usage data for a collection of components can be used for the estimation using an embodiment. Estimates of future power usage by the components for certain workloads can also be estimated using an embodiment.

An embodiment may thus provide power usage information about a component for present or future workloads without requiring additional hardware. An embodiment may thus reduce the cost associated with power management in a data processing environment as well as the cost associated with managing the hardware sensors and As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method comprising:
supplying at a first time, over a common electrical power line to a rack, bulk electrical power to a set of components, the set of components comprising hardware distributed across multiple data processing systems in the rack;
measuring, prior to distributing the bulk electrical power to the set of components, a historical aggregate power consumption of the set of components at the first time, wherein the measuring is regardless of types of components in the set of components wherein each component in the set of components receive a fraction of the historical aggregate power from the common electrical power line;
constructing, using a processor and a memory, a power estimation model using the historical aggregate power consumption of the set of components at the first time;
correlating, using the processor and the memory, in the power estimation model, a factor of a component in the set of components with the historical aggregate power consumption during the period, the factor being a characteristic of the component that is usable in estimating an effect of the component on the historical aggregate power consumption;

providing a value of the factor, the value of the factor being expected at a second time;

computing, using the power estimation model, an estimate of electrical power consumed by the component with the factor being at the provided value; and outputting the estimate as the estimated power usage of the component when the factor attains the value at the second time.

2. The computer implemented method of claim 1, further comprising:

receiving historic data of the aggregate power consumption of the set of components during the period;

receiving historic data of a plurality of values of a set of factors corresponding to the set of the components during the period; and performing, as a part of the generating, a regression analysis using the historic data of the aggregate power consumption and the historic data of a plurality of values of the set of factors to correlate the set of factors to the aggregate power usage during the period.

3. The computer implemented method of claim 2, wherein the correlation is expressed as a polynomial equation of the second order.

4. The computer implemented method of claim 1, wherein the value is a present value of the factor at a present time.

5. The computer implemented method of claim 1, wherein the value is an expected value of the factor in the future for a workload planned to be executed using the component.

6. The computer implemented method of claim 1, wherein the determined time is distinct from the period.

7. The computer implemented method of claim 1, wherein the component is a computer and the factor is a processor utilization of a processor in the computer.

8. The computer implemented method of claim 1, wherein the receiving the power estimation model is for the set of components, the model correlating a set of factors of the set of components with the aggregate power consumption of the set of components.

* * * * *